June 12, 1934.    W. C. McCOY    1,963,026
PISTON
Filed Oct. 12, 1928    2 Sheets-Sheet 1

INVENTOR
BY William C. McCoy
Evans & McCoy
ATTORNEYS

June 12, 1934.   W. C. McCOY   1,963,026
PISTON
Filed Oct. 12, 1928   2 Sheets-Sheet 2

INVENTOR
BY William C. McCoy
Evans & McCoy
ATTORNEYS

Patented June 12, 1934

1,963,026

UNITED STATES PATENT OFFICE 1,963,026

PISTON

William C. McCoy, Cleveland Heights, Ohio, assignor to The Cleveland Trust Company, Cleveland, Ohio, a corporation of Ohio Application October 12, 1928, Serial No. 312,067

8 Claims. (Cl. 309—14)

This invention relates to pistons and more particularly to pistons for internal combustion engines made of a relatively light metal such as aluminum and its alloys, which have a relatively high coefficient of expansion as compared to the metal of the cylinder in which the piston is used.

The present invention has for its object to provide a piston which, during the explosion stroke has one side in full engagement with the cylinder wall, in order to obtain the advantages of better lubrication, greater area of contact and more uniform wear, and in which the lateral play of the pistons is limited by thermally responsive means which prevents objectional lateral shifting of the piston body with respect to its bearing rings during the compression stroke.

More specifically, the invention resides in the application to the piston of a thermally responsive element which coacts with at least one of the piston rings on the head of the piston to limit the relative lateral movement of the piston body and the piston ring at the position of the thermally responsive element to thereby center the piston with respect to the ring during the compression stroke and to permit full engagement of the opposite side of the piston with the cylinder wall during the compression stroke.

A further object is to provide a thermally responsive element in the form of a strut within the piston which provides normal operation of the piston ring on the explosion side of the piston head and provides a rigid backing for the piston ring on the side of the piston against which pressure is brought on the compression stroke, the strut having a coefficient of expansion such as to automatically prevent objectional shifting of the piston head with respect to the cylinder during the compression stroke.

With the above and other objects in view, the invention may be said to comprise the piston as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
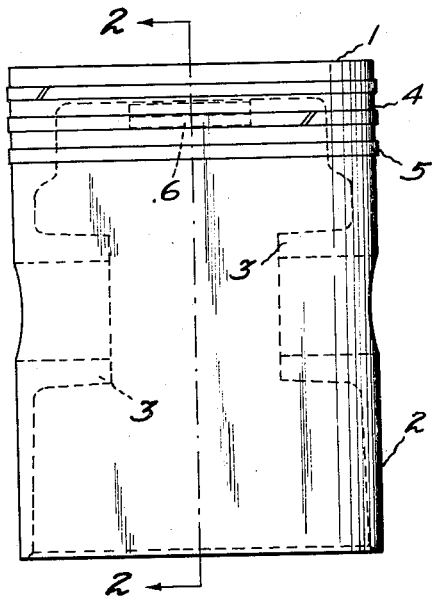
Figure 1 is a side elevation of a piston embodying the invention.
Figure 2:
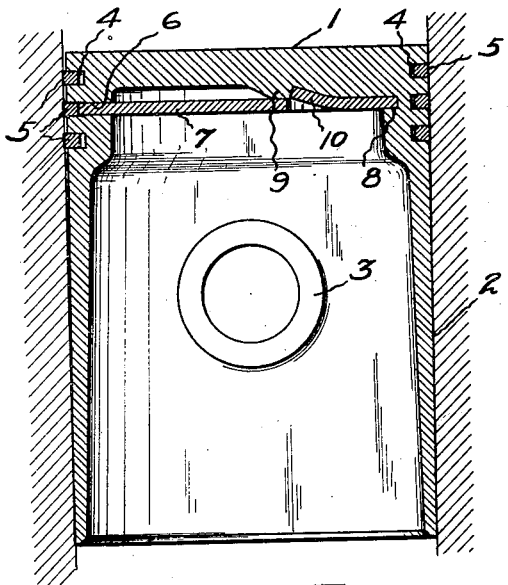
Fig. 2 is an axial section through the piston shown in Fig. 1.

As shown in the accompanying drawings, the piston is in the form of a casting having a head 1, and a cylindrical skirt 2, integral with the head and which has integral wrist pin receiving bosses 3. The head portion of the piston is provided with a plurality of circumferential grooves 4 machined therein to receive expansible bearing rings 5.

At the bottom of one of the grooves 4, there is a circumferentially elongated slot 6 extending through the wall of the piston body and this slot is adapted to receive the outer end of a strut 7 which is preferably in the form of a flat metal strip. The strut 7 extends diametrically across the interior of the piston immediately beneath the head 1 and at right angles to the axis of the wrist pin. The outer end of the strut 7 is positioned in the bottom of the ring groove into which the slot opens and the opposite end of the strut bears against the wall of the piston at a diametrically opposite point. In order to rigidly secure the strut 7 in place, the wall of the piston may be provided with a groove 8 to receive the end of the strut and the head of the piston may be provided with an inwardly projecting lug 9 which may be engaged by a tongue 10 struck up from the body of the strut. The strut 7 may be inserted into the piston through the slot 6 until its inner end engages in the groove 8, after which the tongue 10 is forced outwardly into engagement with the lug 9 to securely lock the strut in place. The outer end edge of the strut 7 may be ground to the correct diameter after the strut has been secured in place, as above described.

The strut may be formed of steel or other metal which has a coefficient of expansion lower than the coefficient of expansion of the metal of the piston, the coefficient of expansion of the strut being such that when the ring 5 engages with the wall of the cylinder and with the end of the strut, the head of the piston body will be in relatively close bearing contact with the explosion thrust side of the cylinder, regardlesss of the amount of play between the piston body and the cylinder. The piston ring is a resiliently expansible ring which maintains circumferential contact with the cylinder wall. During the compression stroke, the thrust on the piston is toward the side of the piston at which the strut 7 engages the ring 5, so that the pressure against the cylinder wall presses the ring 5 against the outer end of the strut 7, the length of the strut 7 and its coefficient of expansion being such that regardless of the temperature, the head of the piston body will be prevented from laterally shifting to an objectionable degree during the compression stroke.

It will be apparent that with the cylinder, the piston and the bearing ring formed of metals having known coefficients of expansion, the coefficient of expansion of the strut which maintains the piston body in proper working relation with respect to the cylinder during the pressure stroke at any working temperature may be computed, the coefficient of expansion of the strut being a function of the coefficients of expansion of the cylinder, piston and bearing ring. The strut will be made of metal having approximately the theoretical coefficient of expansion, the coefficient of expansion of the strut being ordinarily less than that of the piston and of the cylinder because of the higher working temperature of the piston head as compared with the cylinder wall.

During the compression stroke, the pressure against the cylinder wall is not excessive and can be advantageously taken up by the piston rings. On the explosion stroke, however, the lateral pressure against the cylinder wall is very much greater and if this pressure is taken solely upon a piston ring, the pressure per unit of area is excessive and the wear is excessive. The present invention, however, avoids this difficulty by providing a rigid backing for the piston ring only on the side of the piston against which pressure is exerted during the compression stroke. On the other hand, the piston body has full engagement with the wall of the cylinder during the explosion stroke.

Figs. 5 to 11 of the drawings show a modified form of the invention in which the strut is permanently anchored in the body of the piston. In this modification, the strut 11 is provided at its inner end with a laterally bent fork portion 12, which is embedded in the body of the piston by casting the piston with the end 12 projecting into the mold cavity.

Figure 5:
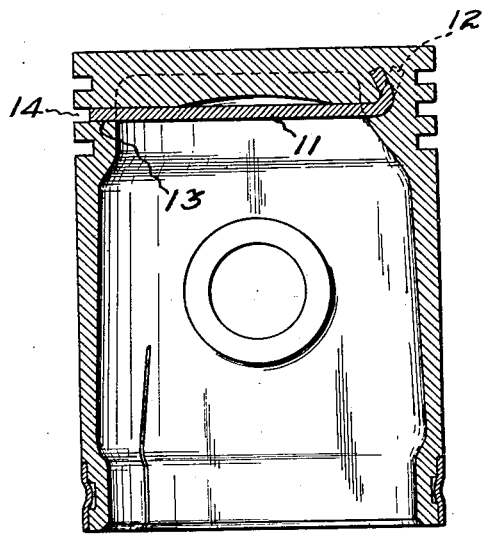
Fig. 5 is an axial section through a piston embodying the invention in a slightly modified form.
Figure 3:
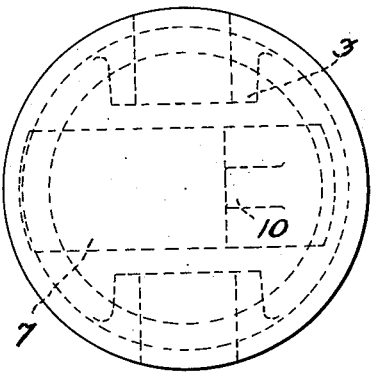
Fig. 3 is a top plan view of the piston shown in Fig.1.
Figure 4:
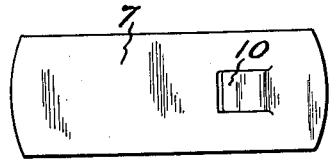
Fig. 4 is a top plan view of the strut detached from the piston.

As shown in Fig. 5, the outer end of the strut 11 projects through a slot 13 in the wall of the cylinder that extends therethrough and into the bottom of a circumferential ring groove 14, the end of the strut being sufficiently free to move in the slot 13 to compensate for expansion of the piston body and the strut having a coefficient of expansion corresponding to that of the strut in the modification first described. The action of the strut in substantially holding the piston body against one wall of the cylinder and thereby limiting the lateral movement thereof is the same as that of the strut 7 first described.

Figure 6:
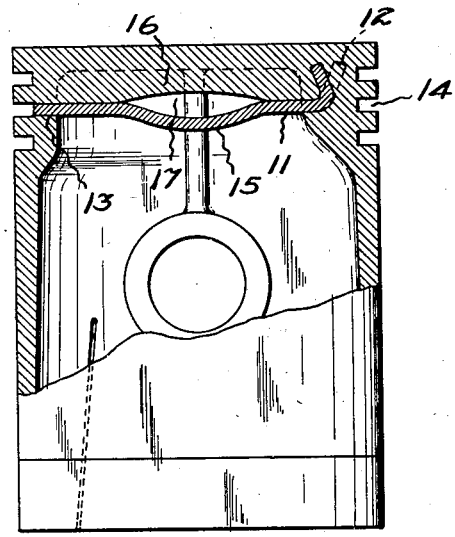
Fig. 6 is a view similar to Fig. 5 showing the strut in the form in which it is cast into the cylinder body.
Figure 7:
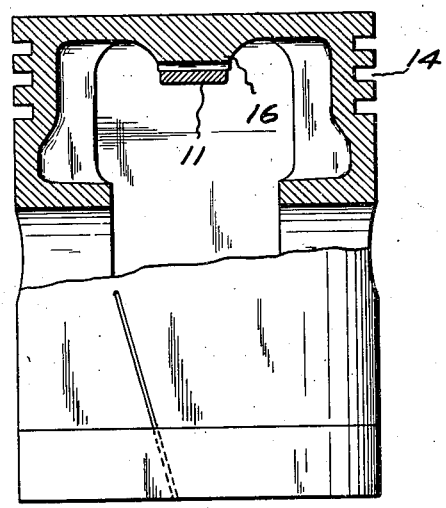
Fig. 7 is an axial section taken in a plane at right angles to that shown in Fig. 6.
Figure 8:
Fig. 8 is a plan view of the strut detached from the cylinder.

In casting the piston, it is desirable that the strut lie entirely within the piston and for this reason, the central portion of the strut is bowed as shown at 15 in Fig. 6 so that the outer end of the strut is supported within the cylindrical cavity of the mold in which the wall of the piston is formed.

Figure 10:
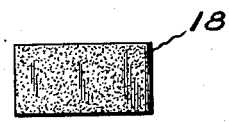
Fig. 10 is a plan view of the core employed for spacing the body of the strut from the piston head in the casting operation.
Figure 9:
Fig. 9 is a side elevation of the strut.
Figure 11:
Fig. 11 is an end elevation of the core.

The head of the piston is provided with an inwardly projecting rib 16 which bears against the outer face of the strut 11 to provide a rigid backing for the strut and opposite the body portion 15 of the strut, the rib 16 is provided with a concavity 17. After the piston is cast, the exterior thereof is turned to the desired diameter and the ring grooves 14 are cut therein. The slot 13 is then cut through the wall from the bottom of the groove opposite the end of the strut 11. The body portion 15 of the strut is then straightened by pressing the bowed portion 15 against the rib 16 and into the recesses 17 to reverse the stresses in the metal so that it will spring back to substantially straight position, causing the outer end of the strut to be forced outwardly through the slot 13 into the bottom of the groove 14. In order to separate the body of the strut 11 from the head of the casting during the casting operation, and to form concavity 17 in the rib 16, a core such as shown at 18 in Figs. 10 and 11 is placed in the mold beneath the body portion 15 of the strut.

It will be apparent that the present invention provides a very simple and effective device for limiting the play of the piston in the cylinder without sacrificing the advantage of full contact of the piston with the cylinder during the explosion stroke.

It will also be apparent that the device of the present invention adds but little to the cost of manufacture of the piston.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A piston for internal combustion engines having an external ring groove, an expansible bearing ring in said groove, and a thermally responsive element engaging the interior of said ring at a single point in its circumference to limit the movement of the ring into the groove at said point.

2. A piston for internal combustion engines having an external ring groove, an expansible bearing ring in said groove, and a thermally responsive element engaging the interior of said ring at a single point in its circumference to limit the movement of the ring into the groove at said point, said point of engagement being diametrically opposite the face of the piston which bears against the cylinder wall on the explosion stroke.

3. A hollow piston having a head provided with an external ring groove, a circumferentially elongated slot in the bottom of said groove extending through the wall of the piston, a strut in the form of a flat metal strip extending diametrically across the piston and having one end slidably fitting in said slot and its opposite end bearing against the interior of the piston wall, at a point diametrically opposite the slot.

4. A piston for internal combustion engines having an external ring groove, an expansible bearing ring mounted in said groove, and a thermally responsive element having one end in engagement with the interior of said ring at a single point in its circumference directly opposite the explosion thrust side of said piston to limit the movement of said bearing ring into the groove at said point, the other end of said thermally responsive element being rigidly secured to the wall of said piston at said explosion thrust side.

5. A piston for internal combustion engines having a head provided with a ring groove, a circumferentially elongated slot in the bottom of said groove extending through the piston wall, a flat thermally responsive strut extending diametrically across said head and having one end slidably fitting in said slot and its opposite end rigidly secured to the interior of the piston wall at a point diametrically opposite said slot, and an expansible bearing ring mounted in said groove, said first mentioned end of said strut engaging the interior of said ring at a single point in its circumference to limit the movement of the ring into the groove at said point.

6. A piston for internal combustion engines having a head provided with a ring groove, a circumferentially elongated slot in the bottom of said groove extending through the side wall of said head at a point diametrically opposite the explosion thrust side of said piston, a flat thermally responsive strut extending diametrically across said head and having one end slidably fitting in said slot and its opposite end rigidly secured to the piston body at the explosion thrust side thereof, and an expansible bearing ring mounted in said groove, said slidable end of said strut engaging the interior of said ring at a single point in its circumference to limit the movement of said ring into said groove diametrically opposite the explosion thrust side of said piston.

7. A hollow piston having an external ring groove and an opening through the wall of the piston to the bottom of said groove, a bearing ring in said groove, and a strut within the piston affixed at one end to the body of the piston and out of engagement with said ring and having its opposite end extending through said opening into said groove to engage the interior face of said ring at one end only of said strut.

8. A piston having an external piston ring groove and an opening through the wall of the piston to the bottom of said groove, a piston ring in said groove, and a strut within the piston having one end extended through said opening and engaged with the interior face of said ring and having its opposite end out of engagement with the ring and embedded in the wall of the piston.

WILLIAM C. McCOY.